United States Patent
Masaoka

Patent Number: 6,097,509
Date of Patent: Aug. 1, 2000

[54] IMAGE SENSOR

[75] Inventor: Hiroaki Masaoka, Kyoto, Japan

[73] Assignee: Rohm Co., Ltd., Kyoto, Japan

[21] Appl. No.: 08/978,372

[22] Filed: Nov. 25, 1997

[30] Foreign Application Priority Data

Nov. 27, 1996 [JP] Japan .................................. 8-316530

[51] Int. Cl.⁷ .................................................. H04N 1/04
[52] U.S. Cl. .......................... 358/482; 348/302; 348/311; 348/312
[58] Field of Search .................................... 358/482, 483, 358/474; 348/241, 243, 248, 249, 294, 311–314, 316, 317, 302, 304, 307, 308, 310; 250/208.1; H04N 1/04

[56] References Cited

U.S. PATENT DOCUMENTS

| | | | |
|---|---|---|---|
| 4,393,397 | 7/1983 | Holmes | 348/614 |
| 4,691,114 | 9/1987 | Hasegawa et al. | 358/474 |
| 4,809,074 | 2/1989 | Imaide et al. | 358/241 |
| 5,149,954 | 9/1992 | Pettijohn et al. | 250/208.1 |
| 5,172,249 | 12/1992 | Hashimoto | 358/482 |
| 5,698,852 | 12/1997 | Tanaka et al. | 250/332 |
| 5,771,070 | 6/1998 | Ohzu et al. | 348/241 |
| 5,808,677 | 9/1998 | Yonemoto | 348/308 |
| 5,812,284 | 9/1998 | Mizutani et al. | 358/482 |
| 5,867,212 | 2/1999 | Toma et al. | 348/311 |
| 5,933,189 | 8/1999 | Nomura | 348/302 |

Primary Examiner—Edward L. Coles
Assistant Examiner—Joseph R. Pokrzywa
Attorney, Agent, or Firm—Arent Fox Kintner Plotkin & Kahn

[57] ABSTRACT

An image sensor has a photoelectric conversion unit composed of an array of a plurality of sets of a photoelectric conversion element having one electrode connected to a power source line and a switching element connected to another electrode of the photoelectric conversion element to receive an output thereof. A shift register, operating in synchronism with a clock supplied thereto, generates a pulse to turn on the switching element. The current that the switching element outputs when turned on is stored in and converted into a voltage by a capacitor. When the switching element is turned on, a transistor that forms a discharging path for the capacitor is connected in parallel with the capacitor. This transistor is turned on with a pulse obtained by delaying the clock. Thus, the capacitor is cleared over a period including periods before and after the switching element is turned on.

1 Claim, 4 Drawing Sheets

IMAGE SENSOR

BACKGROUND OF THE INVENTION

1. Field of the Invention

The present invention relates to an image sensor for use in an image scanner or facsimile machine to read an original image.

2. Description of the Prior Art

An image sensor is composed of a plurality of image sensor chips; it reads an original image by means of a plurality of pixels provided on the image sensor chips, and outputs image data pixel by pixel successively.

In an image sensor chip, a switching element is provided on the output side of each of a plurality of photodiodes (pixels) arranged in a line. As one switching element after another is turned on by the use of switching pulses, the electric charge produced in each photodiode is successively transferred to and temporarily stored in a single capacitor until the stored charge is eventually output as a voltage. Meanwhile, it is essential that the charge from one photodiode be cleared, i.e. discharged, from the capacitor without fail before the switching element for the next photodiode is turned on.

This clearing of the capacitor is usually achieved by turning on a switching transistor provided in parallel with the capacitor. However, in an image sensor chip in which one end of the photodiode is connected to a power source line, when the switching element is turned on with a switching pulse, there occurs a ringing, i.e. oscillatory variation that settles as time passes, in the voltage on the power source line. This results from the voltage regulating action of a constant voltage source circuit as is widely used to produce from an unregulated direct-current voltage a constant voltage to be supplied to the power source line. More specifically, such a constant voltage source circuit reacts to variation in its output voltage, such as occurs when the switching element is abruptly turned on, by attempting to restore the normal output voltage. In particular, if the switching element is turned on substantially at the same time that the switching transistor is turned off, it is inevitable that the switching element is turned on just when the capacitor goes into a state in which it is ready to store electric charge. This causes an increase in "dark output voltage" (i.e. the output voltage that appears when the photodiode is not receiving light) under the direct influence of a ringing.

An increase in dark output voltage is undesirable in itself. In addition, the dark output voltage tends to be influenced by noise (variation) in the power source voltage; that is, noise (variation) in the power source voltage tends to cause noise (variation) in the dark output voltage. In an image sensor, which includes a plurality of image sensor chips, such noise (variation) in the power source voltage usually appears in different manners in different image sensor chips because of different wiring paths or other, and, quite undesirably, this causes the dark output voltage to vary from chip to chip.

SUMMARY OF THE INVENTION

An object of the present invention is to provide an image sensor that produces sufficiently low dark output voltage as a whole and that produces sufficiently small variations in dark output voltage between image sensor chips.

To achieve the above object, according to one aspect of the present invention, an image sensor is provided with a photoelectric conversion unit having an array of a plurality of sets each including a photoelectric conversion element having one electrode connected to a power source line and a switching element connected to another electrode of the photoelectric conversion element to receive an output thereof; pulse generating means for generating a switching pulse to turn on the switching element; a capacitor connected between an output electrode of the switching element and a reference voltage; an output terminal to which a voltage across the capacitor is delivered; and clearing means for clearing electric charge stored in the capacitor. In this image sensor, the clearing means clears the electric charge stored in the capacitor over a predetermined period including periods before and after the switching element is turned on.

According to another aspect of the present invention, an image sensor is provided with a plurality of photodiodes each having one electrode connected to a power source line; a plurality of switching transistors; a plurality of amplifying transistors for amplifying output signals from the photodiodes, each of the amplifying transistors having a control electrode connected to another electrode of a corresponding one of the photodiodes, having another electrode connected to the power source line., and having still another electrode connected to a corresponding one of the switching transistors; a shift register having a plurality of output terminals that are so connected as to drive the switching transistors, the shift register feeding a switching pulse successively to each of the output terminals in synchronism with a clock supplied thereto; a capacitor for storing output signals from the photodiodes, the capacitor receiving the output signals through the amplifying transistors and the switching transistors; a clearing transistor connected in parallel with the capacitor for clearing the capacitor; a clock input terminal from which the shift register receives the clock; and a delay circuit connected between the clock input terminal and a control electrode of the clearing transistor for supplying the clock to the clearing transistor with a delay. In this image sensor, the capacitor is cleared over a predetermined period including periods before and after the switching transistors are turned on.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, an image sensor embodying the present invention will be described with reference to the drawings.

Figure 1:
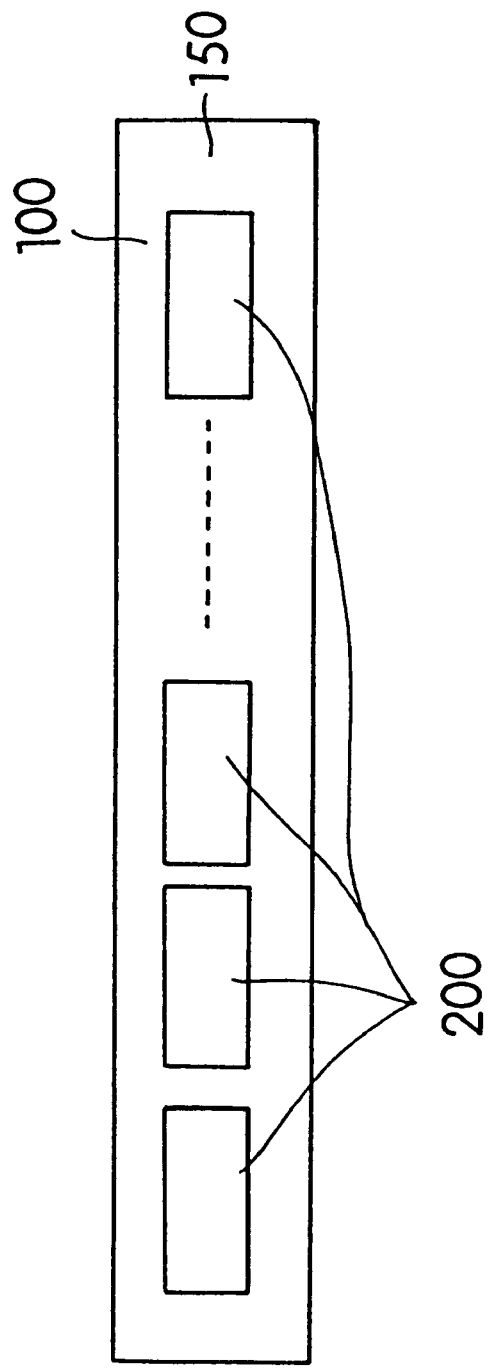
FIG. 1 is a diagram schematically showing the appearance of an image sensor embodying the invention.

FIG. 1 shows the appearance of an image sensor 100 embodying the invention. This image sensor 100 consists of a plurality of image sensor chips 200 that are arranged in a line on a substrate 150 and are driven successively.

Figure 2:
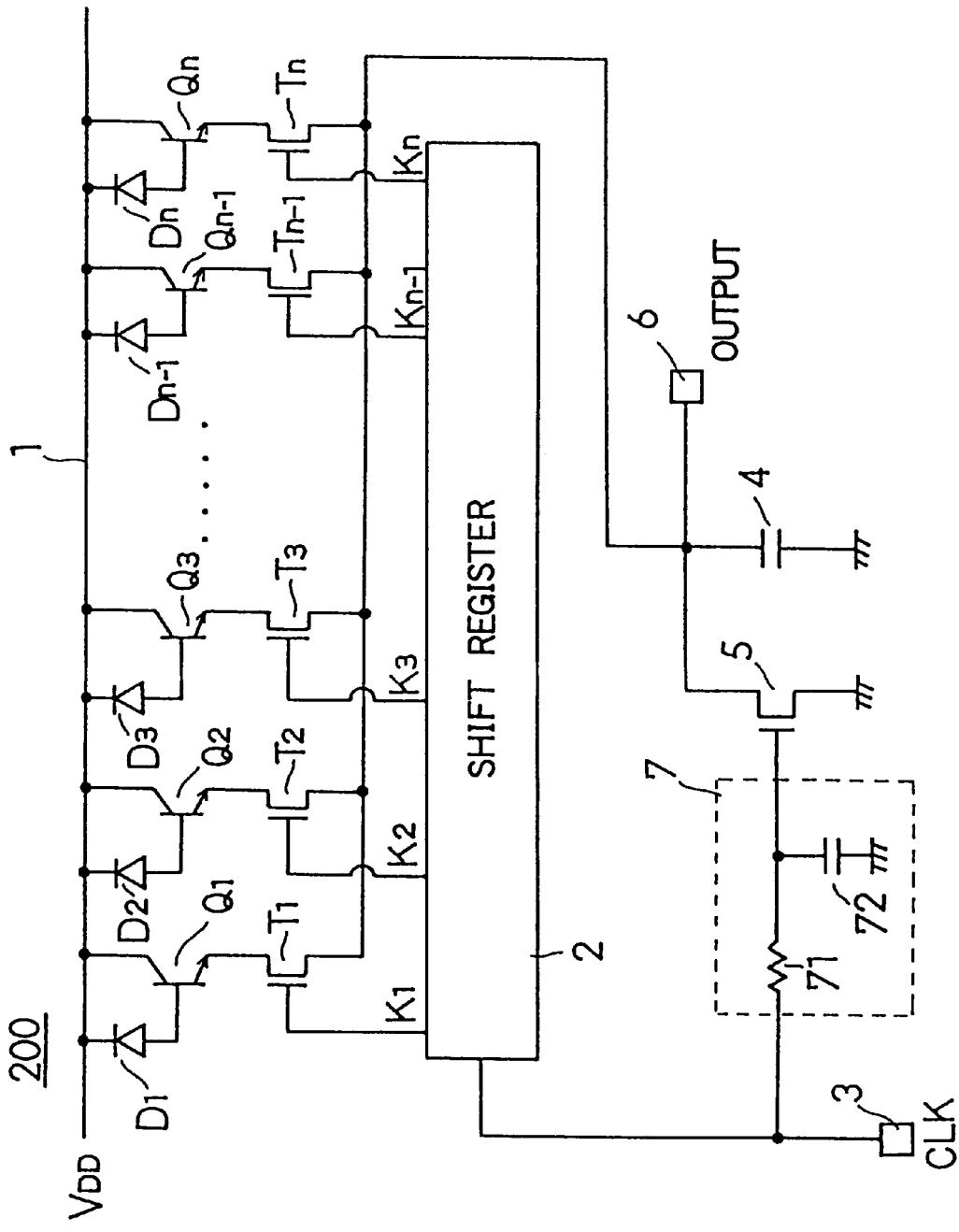
FIG. 2 is a circuit diagram of an example of the constitution of the image sensor chip that is used in multitude in the image sensor shown in FIG. 1.

Each image sensor chip 200 is constituted and operates as follows. FIG. 2 shows an example of the constitution of the image sensor chip 200. In FIG. 2, numeral 1 represents a power source line through which electrical power having a voltage $V_{DD}$ is supplied; numeral 2 represents a shift register; numeral 3 represents a clock input terminal; numeral 4 represents a capacitor; numeral 5 represents an n-channel MOS transistor for clearing electric charge stored in the capacitor 4; numeral 6 represents an output terminal; numeral 7 represents a delay circuit consisting of a resistor 71 and a capacitor 72; $D_1, D_2, \ldots D_n$ represent photodiodes for performing photoelectric conversion; $Q_1, Q_2, \ldots Q_n$ represent npn-type amplifying transistors for amplifying the output currents of the photodiodes; and $T_1, T_2, \ldots T_n$ represent n-channel MOS transistors used as switching elements.

These components are interconnected as follows. The photodiodes $D_1, D_2, \ldots D_n$ have their cathodes connected to the power source line 1 and their anodes connected to the bases of the transistors $Q_1, Q_2, \ldots Q_n$, respectively. The transistors $Q_1, Q_2, \ldots Q_n$ have their collectors connected to the power source line 1 and their emitters connected to the drains of the n-channel MOS transistors $T_1, T_2, \ldots T_n$, respectively. The n-channel MOS transistors $T_1, T_2, \ldots T_n$ have their sources connected to the output terminal 6. The capacitor 4 and the n-channel MOS transistor 5 (more precisely, its drain-source path) are connected in parallel between the output terminal 6 and ground. Through the amplifying transistors $Q_1, Q_2, \ldots Q_n$ and the switching MOS transistors $T_1, T_2, \ldots T_n$, the capacitor 4 receives the output current of one photodiode after another, and stores the received current as electric charge until it eventually outputs the electric charge as a voltage. The transistor 5 serves to clear electric charge that may be previously stored in the capacitor. The shift register 2 and the delay circuit 7 are fed with a clock CLK that is supplied via the clock input terminal 3. The output terminals $K_1, K_2, \ldots K_n$ of the shift register 2 are connected to the gates of the n-channel MOS transistors $T_1, T_2, \ldots T_n$, respectively. The output terminal of the delay circuit 7 is connected to the gate of the n-channel MOS transistor 5.

In synchronism with the trailing edges of the clock CLK it receives, the shift register 2 outputs switching pulses from its output terminals (in order of $K_1, K_2, \ldots K_n$). As a result, in response to the clock CLK, shown at (a) in FIG. 3, that is supplied via the clock input terminal 3, the n-channel MOS transistors $T_1, T_2, \ldots T_n$ are turned on and off as shown at (b) in FIG. 3. The pulse width p of the clock CLK is typically 0.5 $\mu$s.

The time constant of the resistor 71 and the capacitor 72 constituting the delay circuit 7 is so determined that the delay circuit 7 provides a delay corresponding to the length of time $\alpha$ (typically several tens of nanoseconds) that is required for the capacitor 4 to fully discharge the electric charge stored therein by dark current. The delay circuit 7 receives the clock CLK, and outputs it after adding a delay to its rising and trailing edges as shown in FIG. 4. Since the transistor 5 has a threshold value E, this means that the pulses in the clock CLK are delayed by $\alpha$. As a result, in response to the clock CLK shown at (a) in FIG. 3, the n-channel MOS transistor 5 is turned on and off as shown at (c) in FIG. 3.

In this way, the electric charge stored in the capacitor 4 is cleared, and thereafter the photoelectric current from the photodiode $D_k$ is amplified by the transistor $Q_k$ and is supplied to the capacitor 4 to be stored therein as electric charge, and then the voltage produced across the capacitor 4 by the stored electric charge is fed via the output terminal 6 to an unillustrated external circuit (for example, a signal processing circuit). This is repeated to process the current from each photodiode $D_k$ successively in order of k=1, 2, . . . n. That is, each photodiode $D_k$ corresponds to one pixel, and the image sensor as a whole outputs image data pixel by pixel successively.

Figure 3:
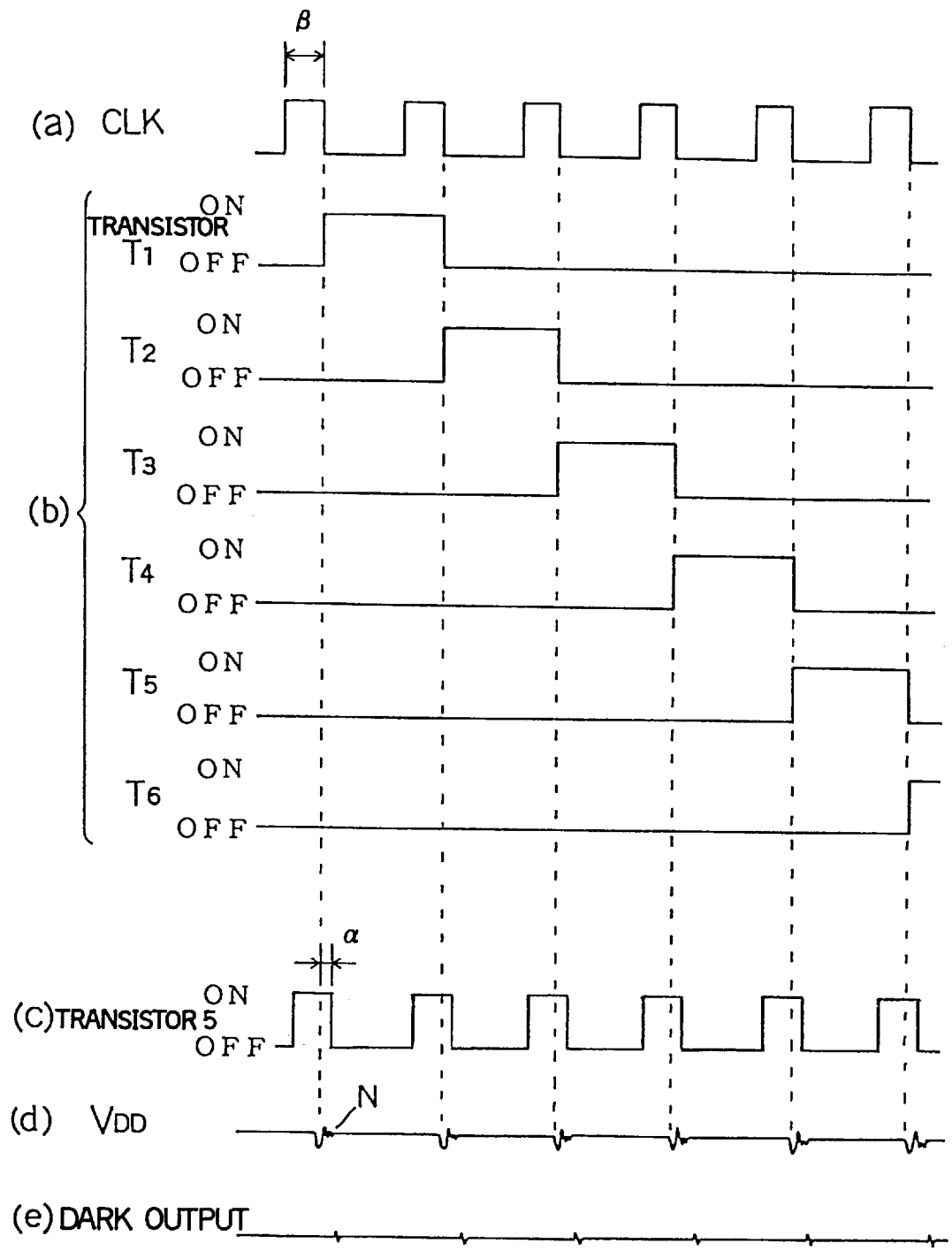
FIG. 3 is a diagram showing the waveforms observed at relevant points within the image sensor chip shown in FIG. 2.
Figure 4:
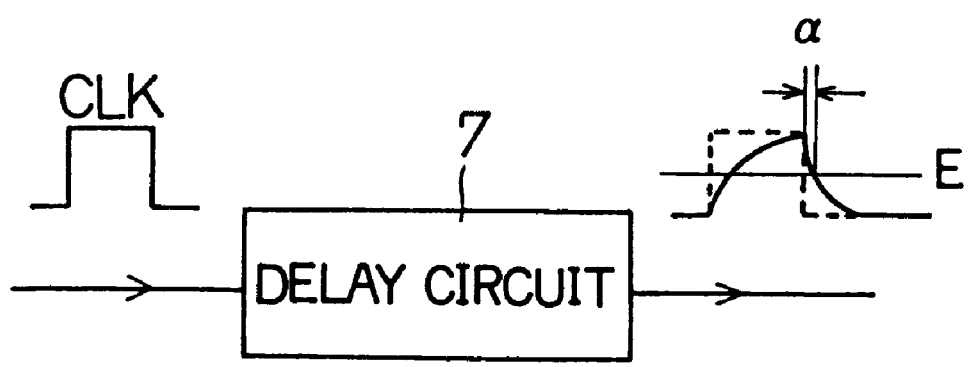
FIG. 4 is a diagram showing the relationship between the input and output of the delay circuit of the image sensor chip shown in FIG. 2.

Note that the image sensor of the embodiment does not increase the dark output voltage, as shown at (e) in FIG. 3. This is because, although turning on the n-channel MOS transistor $T_k$ causes noise (variation) in the voltage $V_{DD}$ on the power source line 1 as shown at (d) in FIG. 3, the n-channel MOS transistor 5 is kept on while the noise is present in $V_{DD}$ as shown at (c) in FIG. 3. More specifically, the clearing of the electric charge stored in the capacitor 4 helps to short-circuit the emitter current of the transistor $T_k$ resulting from the current (the base current of the transistor $Q_k$) that flows through the junction capacitance of the photodiode when the transistor $T_k$ is turned on in a dark state, and thus no electric charge is stored in the capacitor 4 meanwhile. As a result, the output of the image sensor is never affected by the current that flows through the junction capacitance of the photodiode when the transistor $T_k$ is turned on in a dark state, nor by the noise (variation) that appears in the voltage $V_{DD}$ on the power source line 1 when the transistor $T_k$ is turned on.

The image sensor of the embodiment has 18 image sensor chips, each containing 96 pixels (photodiodes). Image data is obtained from one image sensor chip after another, each outputting its share of image data pixel by pixel successively. The clock CLK consists of pulses occurring at 2 us intervals and having a pulse width of 0.5 $\mu$s. The output period of each pixel (the interval at which each transistor $T_k$ is turned on) is 5 ms. In this embodiment, it is also possible to use p-channel MOS transistors instead of the n-channel MOS transistors $T_1, T_2, \ldots T_n$; in that case, the output polarity of the shift register 2 needs to be reversed.

As described heretofore, in an image sensor according to the present invention, even if a current from the power source line momentarily flows through the photoelectric conversion element (i.e. the junction capacitance of the photodiode) when the switching element is turned on in a dark state, the current does not affect the dark output voltage at all, and thus it causes substantially no increase in the dark output voltage of each pixel. As a result, it is possible to realize an image sensor that not only produces sufficiently low dark output voltage as a whole but also produces sufficiently small variations in dark output voltage between image sensor chips.

What is claimed is:

1. An image sensor comprising:

a plurality of photodiodes each having one electrode connected to a power source line;

a plurality of switching transistors;

a plurality of amplifying transistors for amplifying output signals from said photodiodes, each of said amplifying transistors having a control electrode connected to another electrode of a corresponding one of said photodiodes, having another electrode connected to said power source line, and having still another electrode connected to a corresponding one of said switching transistors;

a shift register having a plurality of output terminals that are so connected as to drive said switching transistors, said shift register feeding a switching pulse successively to each of said output terminals in synchronism with a clock supplied thereto;

a capacitor for storing output signals from said photodiodes, said capacitor receiving said output signals through said amplifying transistors and said switching transistors;

a clearing transistor connected in parallel with said capacitor for clearing said capacitor;

a clock input terminal from which said shift register receives the clock; and a delay circuit connected between said clock input terminal and a control electrode of said clearing transistor for supplying the clock to said clearing transistor with a delay, wherein said capacitor is cleared over a predetermined period including periods before and after said switching transistors are turned on.

* * * * *